US010688712B2

(12) United States Patent
Mason et al.

(10) Patent No.: US 10,688,712 B2
(45) Date of Patent: Jun. 23, 2020

(54) APPLICATOR FOR APPLYING PROTECTIVE COVERINGS TO ELECTRONIC DEVICE DISPLAYS

(71) Applicant: Alpha Comm Enterprises, LLC, Lawrenceville, GA (US)

(72) Inventors: Andrew Mason, La Verne, CA (US); Brandon Lambertson, La Verne, CA (US)

(73) Assignee: Alpha Comm Enterprises, LLC, Lawrenceville, GA (US)

(*) Notice: Subject to any disclaimer, the term of this patent is extended or adjusted under 35 U.S.C. 154(b) by 600 days.

(21) Appl. No.: 14/484,625

(22) Filed: Sep. 12, 2014

(65) Prior Publication Data

US 2015/0314523 A1    Nov. 5, 2015

Related U.S. Application Data

(63) Continuation-in-part of application No. 61/876,935, filed on Sep. 12, 2013.

(51) Int. Cl.
*B29C 63/02* (2006.01)
*B29C 63/00* (2006.01)
*C09J 7/22* (2018.01)

(52) U.S. Cl.
CPC .......... *B29C 63/02* (2013.01); *B29C 63/0004* (2013.01); *C09J 7/22* (2018.01); *B29C 2063/027* (2013.01); *Y10T 156/17* (2015.01); *Y10T 428/1471* (2015.01)

(58) Field of Classification Search
CPC . B29C 63/0004; B29C 63/02; B29C 63/0047; B29C 2063/027
See application file for complete search history.

(56) References Cited

U.S. PATENT DOCUMENTS

| | | | |
|---|---|---|---|
| 3,907,628 A * | 9/1975 | Buske | B44C 7/06 156/574 |
| 4,895,746 A * | 1/1990 | Mertens | G09F 3/02 428/194 |
| 5,086,946 A * | 2/1992 | Blackwell | B42D 5/005 221/45 |
| 7,957,524 B2 | 6/2011 | Chipping | |
| 8,393,377 B2 | 3/2013 | Patel et al. | |
| 2010/0252567 A1* | 10/2010 | Konsti | B42D 5/005 221/307 |
| 2012/0211170 A1 | 8/2012 | Patel et al. | |
| 2012/0211171 A1* | 8/2012 | Patel | B29C 63/0004 156/538 |
| 2013/0237296 A1* | 9/2013 | Chen | B29C 63/0004 455/575.8 |
| 2015/0246514 A1* | 9/2015 | LaColla | B29C 63/02 156/60 |

* cited by examiner

*Primary Examiner* — Scott W Dodds
(74) *Attorney, Agent, or Firm* — Hill, Kertscher & Wharton, LLP

(57) ABSTRACT

An applicator is provided for applying protective films to electronic device displays. The applicator includes a base, a screen protector, and a squeegee. The base includes a pocket for receiving an electronic device. The screen protector is affixed to the base so as to overlie an electronic device. The screen protector preferably includes three layers including a protective film, cap sheet, and back liner. The squeegee is provided for removing the back liner and for simultaneously affixing the protective film to an electronic device.

16 Claims, 14 Drawing Sheets

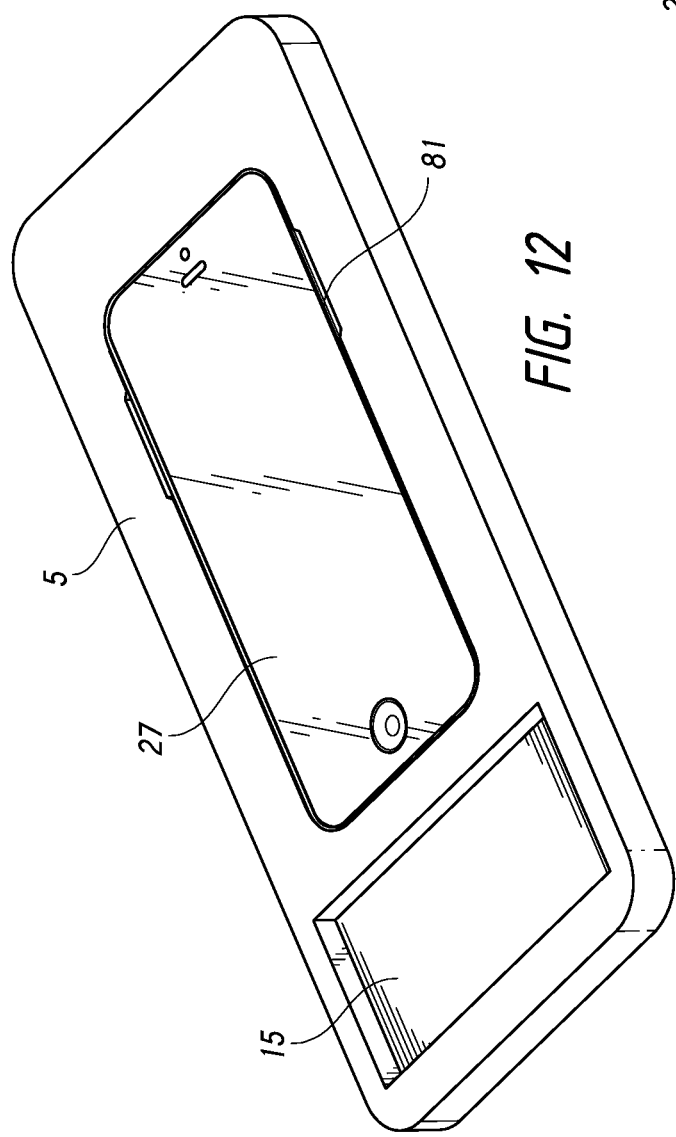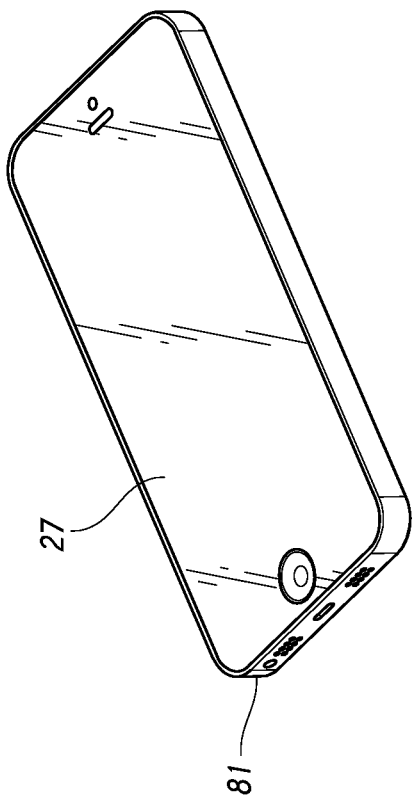

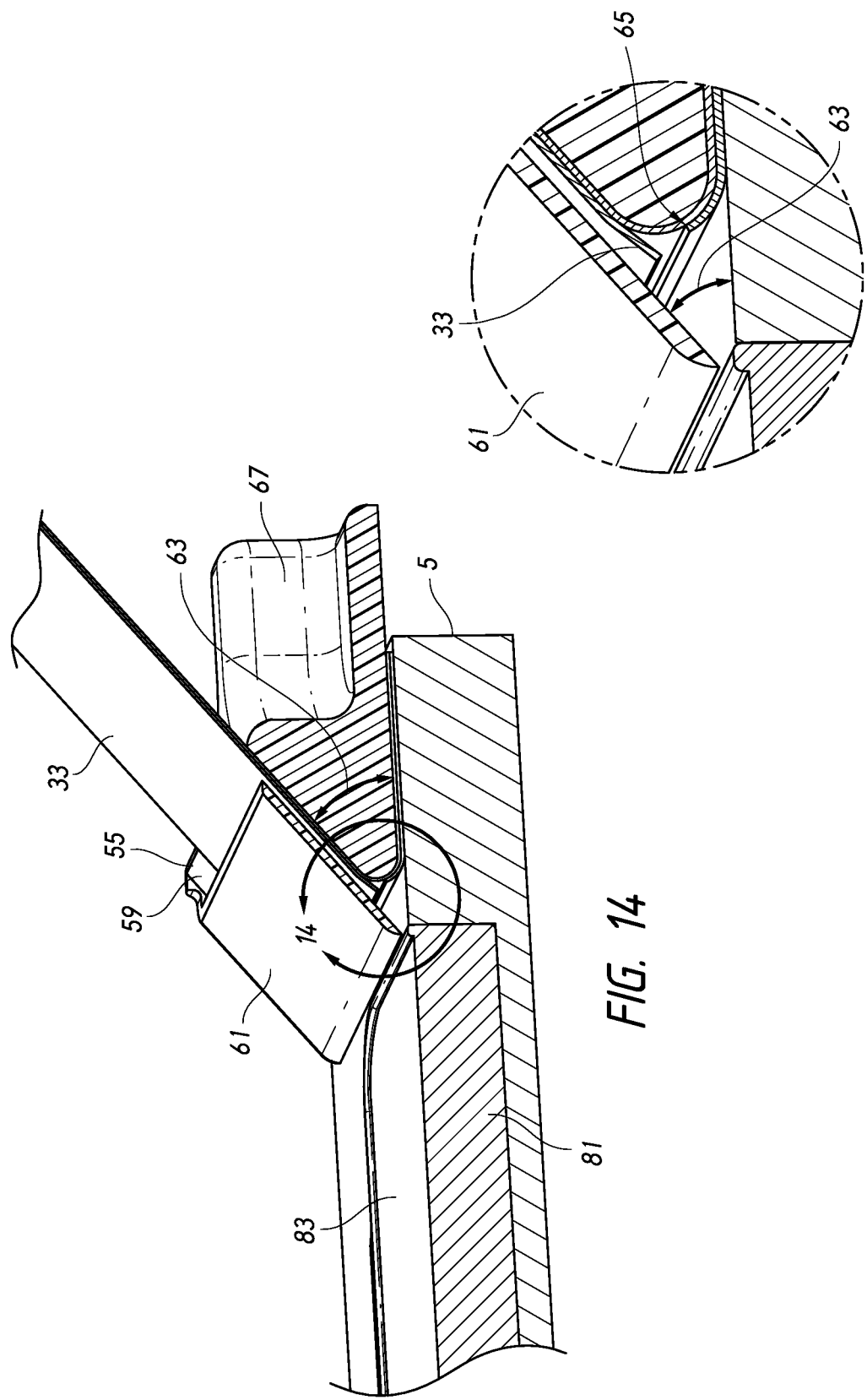

APPLICATOR FOR APPLYING PROTECTIVE COVERINGS TO ELECTRONIC DEVICE DISPLAYS

RELATED APPLICATIONS

The present application is a continuation-in-part of U.S. Provisional Patent Application Ser. No. 61/876,935 filed on Sep. 12, 2013.

BACKGROUND OF THE INVENTION

The present invention relates to protective coverings. More particularly, the present invention relates to protective coverings for the screen displays of electronic devices. Even more particularly, the present invention relates to an applicator for applying protective coverings to electronic device screens.

Portable electronic devices have proliferated in modern society. These devices include cellular telephones, digital music players, tablet computers, personal digital assistants, notebook computers and even electronic watches. Each of these devices typically has an electronic display in the form of a screen for displaying information. Often these screens are "touch" screens which act as a graphical interface.

Various attempts have been made to protect the electronic displays. For example, phone covers have been developed for covering all surfaces of a phone except for the display. The edges of the phone are protected from shock, scratches or the like. Moreover, these covers provide some protection to the screen by extending beyond the edge of the screen. Gorilla Glass® is a hardened glass which provides some additional protection compared to traditional glass. However, even this type of glass can break or scratch.

Translucent films have been developed for protecting an electronic display. An example of such a film protector is disclosed in U.S. Pat. No. 7,957,524 which describes a kit including a film, squeegee and liquid for applying the film to the screen of an electronic device such as a cellular telephone. These films provide excellent protection for the screen against scratching and impact shock. More recently, films have been developed which provide anti-bacterial properties.

Unfortunately, application of the translucent film to the display can be troublesome. Earlier films required that a liquid solution be applied to the screen prior to application of the film. The liquid solution activated the adhesive on the film by allowing the film to slide into its proper position and allow air bubbles to escape. Unfortunately, the use of the liquid solution was messy, annoying, and could void manufacturers warranties on the cellular telephones as the manufacturers were concerned that the liquid could interfere with the operation of the electronic device.

More recently, "dry" films have been developed which do not require a liquid solution to squeeze out bubbles. Unfortunately, even these dry films are difficult to install and prone to fingerprints forming under the shield adjacent to the electronic display.

U.S. Patent Application No. 2012/0211170 and U.S. Patent Application No. 2012/0211171 disclose applicators for applying shields to electronic displays. Unfortunately, even these applicators are difficult to use and prone to failure.

Accordingly, there is a need for an improved applicator for applying protective films to the displays of electronic devices.

Preferably, the improved applicator would be inexpensive to manufacture and easy to use.

Preferably, the improved applicator would firmly hold an electronic display in place while applying a protective film to the device's electronic display.

SUMMARY OF THE INVENTION

The present invention addresses the aforementioned disadvantages by providing an improved applicator for applying protective films to electronic device displays. Preferably, the applicator is provided in a kit form which is packaged to include each of the elements for applying a protective film. The applicator includes a screen protector. The term "screen protector" is often used to refer to a single sheet of film which has been applied to an electronic device's display. However, herein the term "screen protector" is intended to refer to the protective film to be applied to an electronic device, as well as a back liner which covers the protective film's adhesive prior to application of the protective film to a display. More preferably, the preferred screen protector of the present invention includes three layers including a protective film, a back liner and a cap sheet.

The protective film is made of a clear plastic, preferably polyurethane, which is precut to cover the display of an electronic device such as a cellular telephone. The screen protector's back liner is a flexible sheet of material, preferably also clear plastic, which covers the adhesive surface of the protective film. The back liner may be adhered to the protective film using various adhesives known to those in the art. However, the back liner is loosely adhered to the protective film so as to allow the back liner to easily peel from the film layer while maintaining sufficient adhesive upon the protective film for the protective film to adhere to an electronic display. Meanwhile, the cap sheet loosely adheres and covers the protective film's upper surface so as to provide protection to the protective film. Again, the cap sheet is loosely adhered to the protective film so as to allow one to peelably remove the cap sheet from the protective film. In a preferred embodiment, the cap sheet is adhered to the protective film in a manner so as to have lesser adherence to the protective film at the end wherein the cap sheet is intended to first peel away from the protective film than at the opposite end of the protective film.

The applicator of the present invention further includes a base having an upper surface and a pocket formed into the base's upper surface. The pocket is sized to receive an electronic device and maintain the electronic device in a predetermined position and alignment with the electronic display positioned to face upwardly. Maintaining the electronic device in a proper position can be accomplished by sizing and shaping the pocket so as to snuggly receive the electronic device. Alternatively, various constructions such as pins or shoulders may be incorporated into the base's pocket to maintain the electronic device in a proper position and alignment. Preferably, the base includes a second pocket for receiving a squeegee.

The screen protector and its layers are described herein as having first and second ends. Furthermore, the applicator's base is described herein as having first and second end. The applicator is constructed so that the screen protector's first end is affixed to the base's first end in a manner that positions the screen protector to overly the base's pocket with the back liner adjacent to pocket; the protective film positioned above the back liner; and the cap sheet affixed above the protective film so as to sandwich the protective film between the back liner and cap sheet. Moreover, the cap sheet affixes to the base so as to position the protective film to overly and align with the display of an electronic device that has been positioned within the base's pocket. In a preferred embodiment, the protective film and cap sheet include an edge portion which extends beyond the electronic display so as to also adhere to the base.

The applicator includes a squeegee having a substantially flat bottom surface and a laterally extending bore which forms a slot. The slot is sized for receipt of the screen protector. The slot is constructed to angle relative to the squeegee's bottom surface at an angle of less than 90°. Preferably, the squeegee slot is angled relative to the squeegee's bottom surface at between 28° and 48°. The preferred angle between the squeegee's slot and the squeegee's bottom surface is 38°.

Preferably, the applicator's base, screen protector and squeegee are prepackaged within traditional packaging such as a box, sleeve or plastic wrapping. Within the packaging, the screen protector is affixed to the base, and the squeegee is positioned with the base's second pocket.

To apply the protection film to an electronic device, the base is removed from the packaging. The squeegee is removed from the base's second pocket. The screen protector, which overlies the base's first pocket, is folded backwardly more than 90° and an electronic device is placed within the base's first pocket with the electronic device's display positioned to face upwardly. While folded back, the screen protector is projected into the squeegee's slot in a manner that maintains the squeegee's bottom surface parallel to the electronic device, and the squeegee is slid downwardly while receiving the screen protector until the squeegee's bottom surface engages the base. As a result of the screen protector bending backwardly, the protective film peels away from the screen protector's back liner. Thereafter, the squeegee is slid across the base's upper surface and the electronic device's display so as to cause the back liner to peelably disengage from the protective film while simultaneously forcing the protective film to engage and adhere to the electronic device's display. Advantageously, the squeegee will also simultaneously squeeze out air bubbles between the protective film and electronic device display. Once the squeegee has completely slid across the electronic device, the base liner has been caused to peel away from the protective film.

Thereafter, an individual removes the cap sheet from the protective film by simply peeling the cap sheet from the protective film which has been affixed to an electronic device. Preferably, the cap sheet is peeled away from the protective film at an end wherein the adhesive provides less adhesion than the other end. This change in adhesion can be accomplished those skilled in the art. For example, lesser or more adhesive may be applied between the cap sheet and protective film at their respective ends so as to cause a greater adhesion at one end of the cap sheet than the other. Alternatively, different adhesives having different adhesive properties may be employed to vary the adhesion between the protective film and cap sheet. Once the cap sheet has been removed, the electronic device can be removed from the base's pocket for use with a now protected display.

Thus, it is an object of the present invention to provide an applicator for applying protective films electronic devices.

Moreover, it is an object of the present invention to provide an applicator which can be packaged in kit form for use by non-professionals to apply electronic devices at their homes or businesses.

It is still an additional object of the present invention for providing an applicator which properly aligns and applies a protective film upon an electronic device display which simultaneously removes bubbles.

Other features and advantages of the present invention will be appreciated by those skilled in the art upon reading the detailed description which follows with reference to the attached drawings.

BRIEF DESCRIPTION OF THE DRAWINGS

FIG. 12 is a perspective view of the applicator of the present invention illustrated holding an electronic device with a newly applied protective film;

FIG. 13 is a perspective view an electronic device with a newly applied protective film;

FIG. 14 is a cut away view illustrating the back liner peeling from the protective film;

FIG. 15 is a close-up cut away view of the applicator in FIG. 14 illustrating the back liner peeling from the protective film.

DETAILED DESCRIPTION OF THE INVENTION

Figure 1:
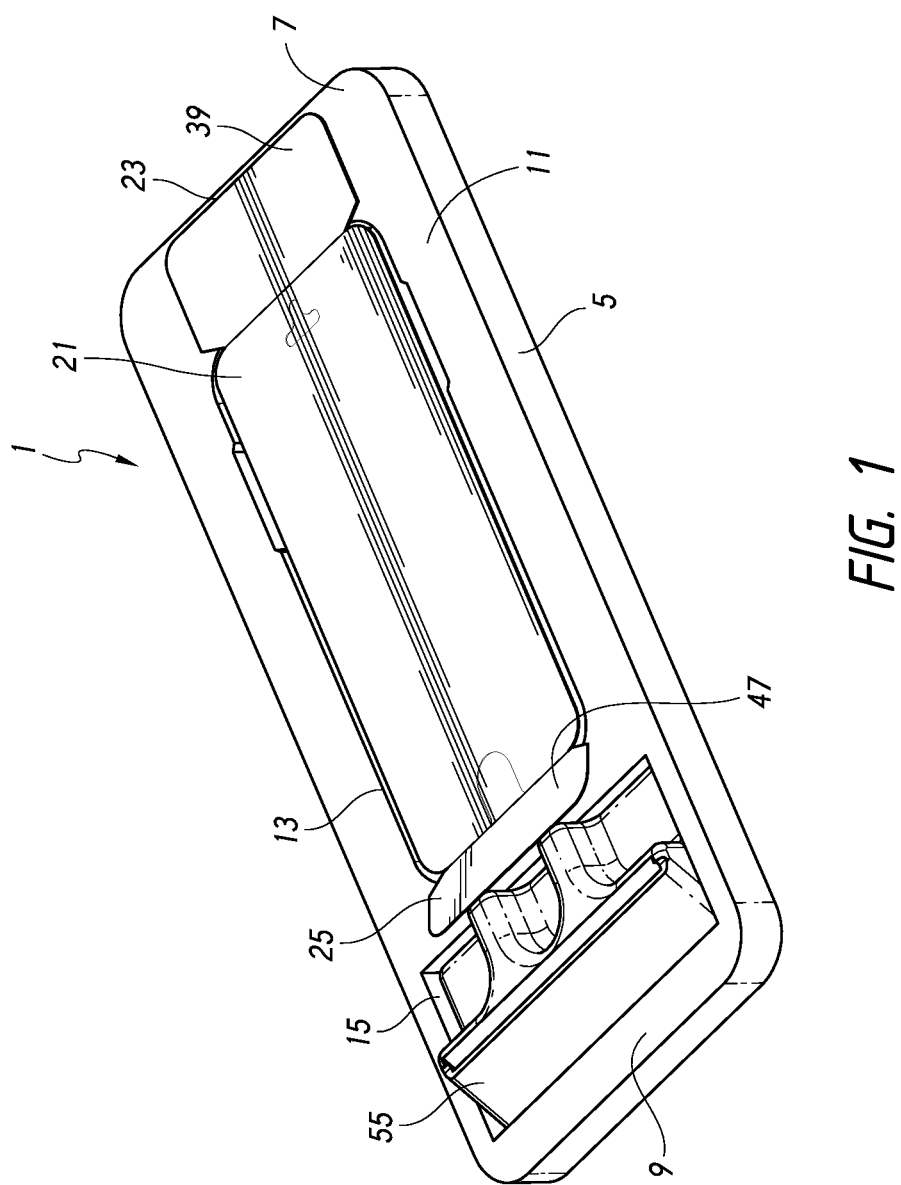
FIG. 1 is a perspective view of the applicator of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-16, the present invention is an applicator 1 for applying a protective film 27 to an electronic device's display 83. Preferably the applicator 1 is provided in a kit form including each of the components in a prepackaged format. The applicator's primary components include a base 5, a screen protector 21, and a squeegee 55.

As illustrated in FIGS. 1-12, the base 5 is preferably elongate to form a first end 7, a second end 9, and an upper surface 11. The base 5 further includes a first pocket 13 formed into the base's upper surface 11. The first pocket 13 may be constructed in various shapes and sizes depending on the electronic device 81 intended to be placed in such pocket. Preferably, the base 5 also has a second pocket 15 for receiving a squeegee 55. The base 5 is preferably made of foam which is sufficiently soft to accept an electronic device 81 into its first pocket 13 without scratching, marring or otherwise damaging the electronic device while also affixing an electronic device in place so as to prevent movement of the phone. To this end, preferably the base's first pocket 13 is sized to provide a slight press-fit to an electronic device within the pocket. The base may be manufactured by various manufacturing techniques known to those skilled in the art. In a preferred embodiment, the base is manufactured in three layers including a bottom layer of foam, a second middle layer of dye cut foam wherein cavities have been created to form the first pocket 13 and second pocket 15. Preferably, the base has an upper layer of polyvinyl chloride to provide a smooth rigid surface.

Figure 16:
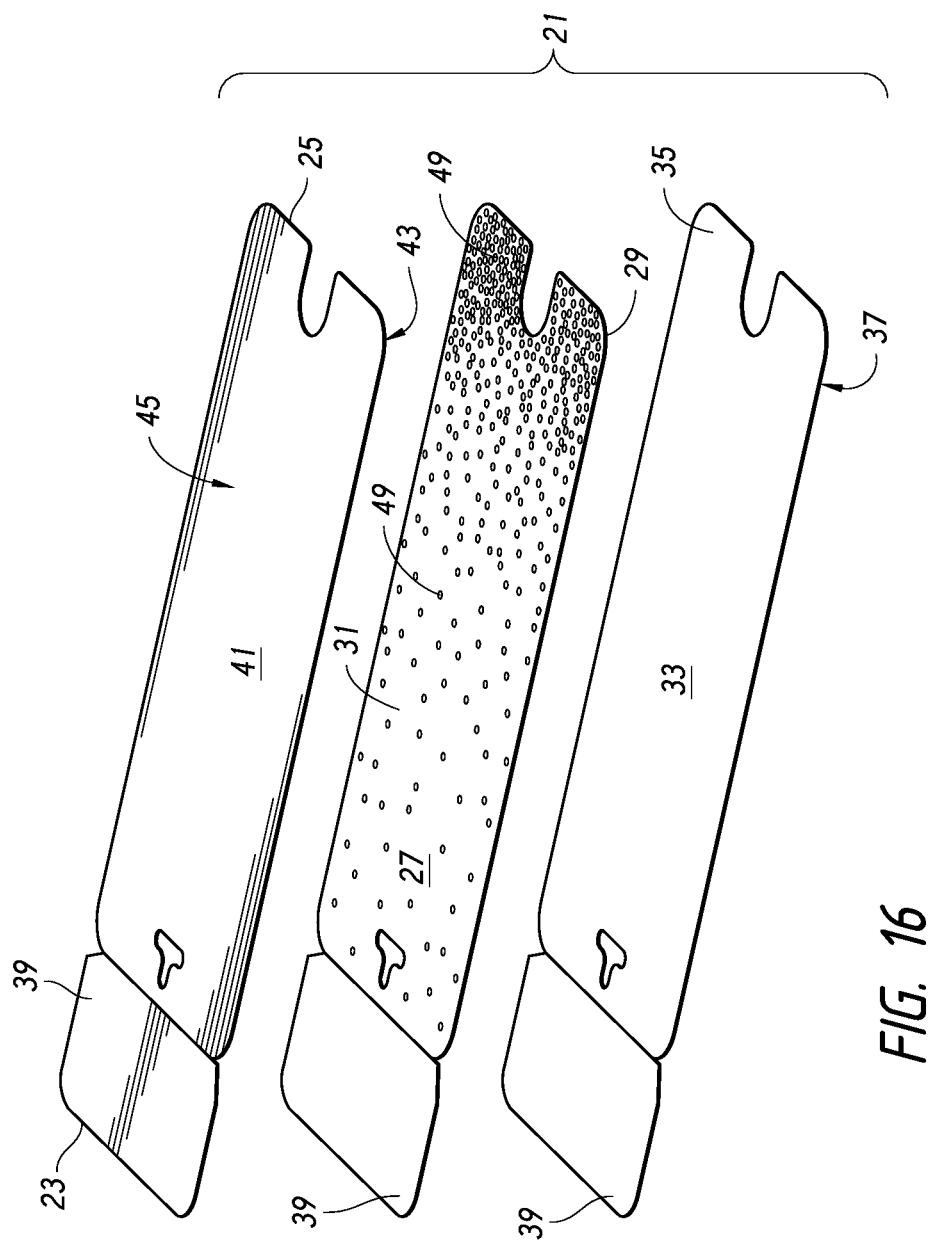
FIG. 16 is a perspective view of screen protector of the present invention illustrating its three components including a cap sheet, protective film, and back liner.

The applicator's screen protector 21 preferably includes three layers of clear plastic 25. As illustrated in FIG. 16, the screen protector 21 includes a protective film 27 sandwiched between a back liner 33 and a cap sheet 41. The protective film 27 is preferably made of polyurethane which may include various additives such a for ultraviolet (UV) protection or bacteriacidal capabilities. The protective film 27 has a lower adhesive side 29 intended to affix to an electronic device display 83 and an upper exterior surface 31 for protecting an electronic device. The screen protector's back liner 33 has a lower side 37 and an adhesive side 35 which loosely adheres to the protective films adhesive side 29. The third layer of the protective film 27 is the cap sheet 41. The cap sheet 41 has a lower adhesive side 43 which loosely adheres to the protective films upper exterior surface 31. The cap sheet 41 also includes an exterior side 45.

The screen protector's first end 23 is affixed to the base's first end 7 so as to allow the screen protector to overlie the base's first pocket 13. As illustrated in FIGS. 1-12, the screen protector 21 is affixed to the base by providing one or more layers of the screen protector with an edge portion 39 which extends to cover and adhere to the base's upper surface 11 at its first end 7. Where the back liner 33 or protective film 27 extends to engage and adhere to the base 5 at the base's first end 7, preferably each of these layers include "kiss cuts". The kiss cut through the protective film allows the portion of protective film, which is intended to adhere to an electronic device display 83, to separate from the protective film's tab 39. Similarly, the back liner 33 includes a kiss cut so as to allow the back liner to crack and tear from the screen protector's tab 39. As understood by those skilled in the art, a "kiss cut" is a cutting of material, typically through a dye cut, to extend partially but not all the way through a material. Here, it is preferred that the protective film 27 include a kiss cut which extends 95% of the way through the protective film layer. However, it is preferred that the back liner 33 is cut completely from the screen protector's edge portion 39 so as to allow it to more easily separate and peel from the protective film 27. Furthermore, the screen protector's tab 39 may include alignment holes for properly aligning the screen protector upon the base 5 during the manufacturing process.

With reference to FIGS. 14 and 15, the applicator 1 of the present invention further includes a squeegee 55 which is preferably positioned within the base's second pocket 15. The squeegee 55 has a substantially planar bottom surface 57. In addition, the squeegee 55 includes a bore which laterally extends to form a slot 59. The squeegee's slot 59 is angled relative to the squeegee's bottom surface 57. Furthermore, preferably the squeegee 55 includes an angled front side 61 forming the front side of the slot 59. Moreover, preferably the bottom surface 57 includes a rounded edge where the squeegee's bottom surface interfaces with the slot 59. As illustrated in FIGS. 14 and 15, the squeegee slot 59 is angled relative to the squeegee's bottom surface 57 at an angle 63 of less than 90°. Preferably, the squeegee slot is angled relative to the squeegee's bottom surface at between 28° and 48°, with the presently preferred angle at 38°. The squeegee 55 may include finger recesses 67 sized for receiving a person's fingers to facilitate manipulation of the squeegee.

Figure 2:
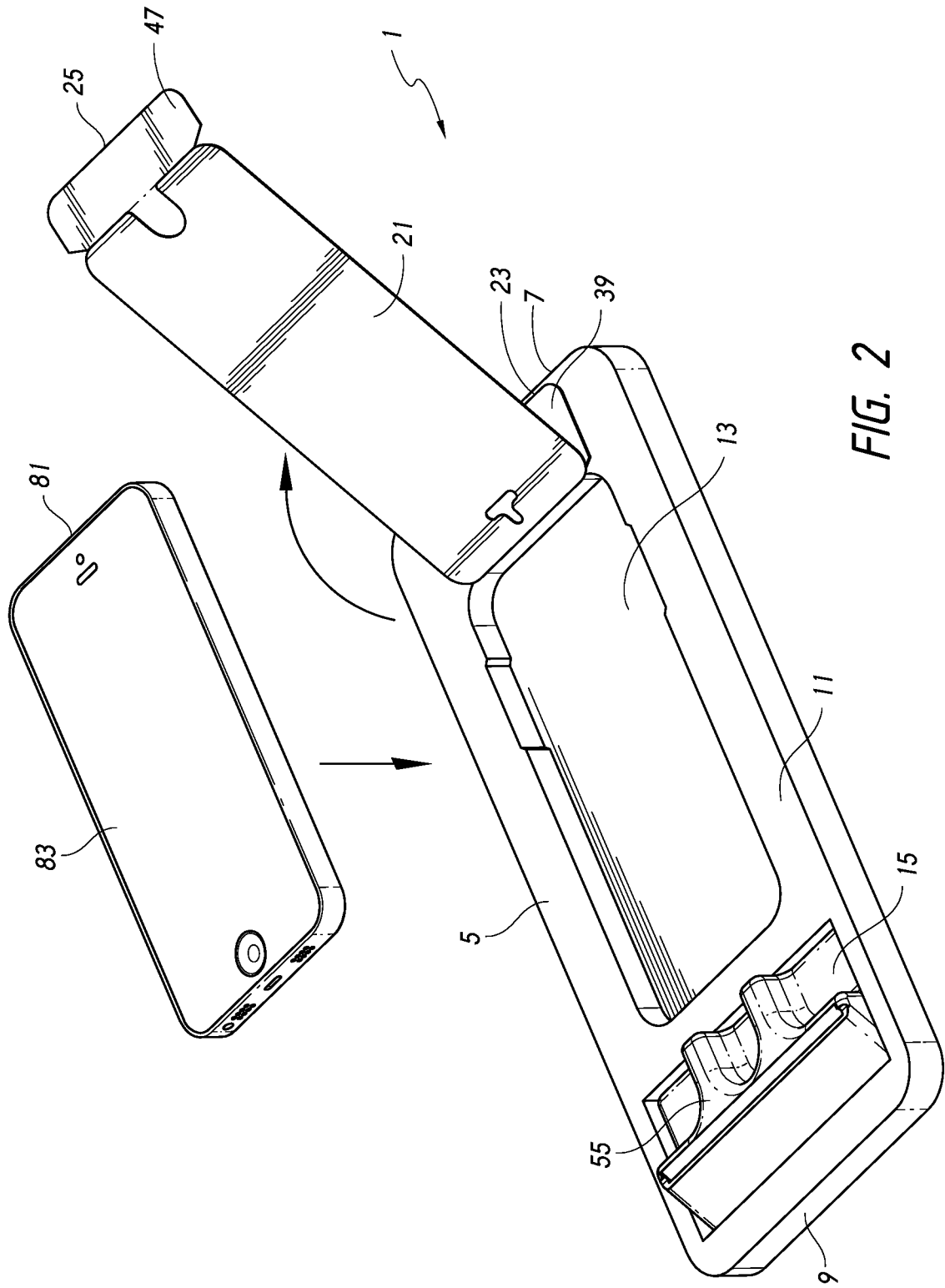
FIG. 2 is a perspective view of the applicator of the present invention illustrating insertion of an electronic device into the base's pocket.
Figure 3:
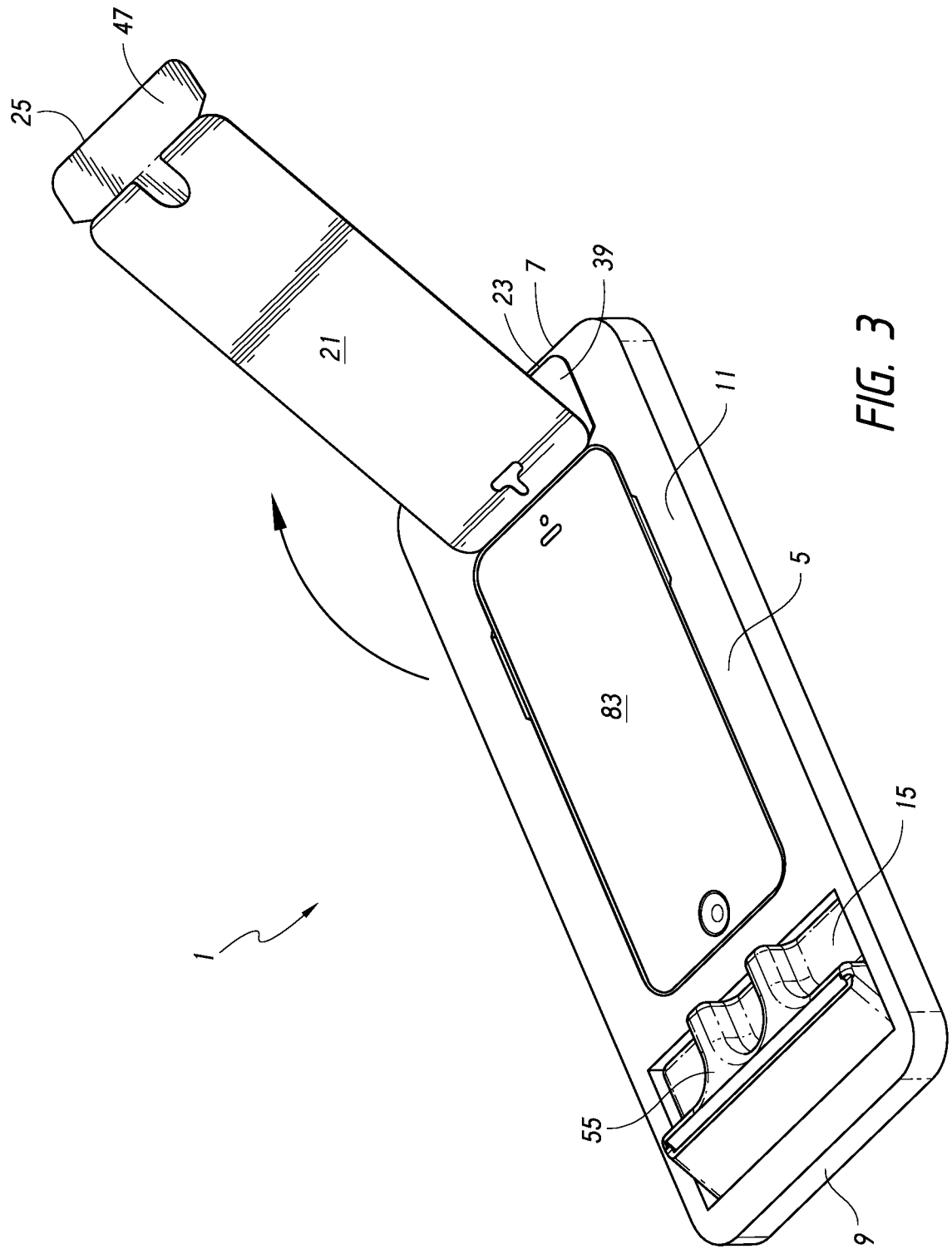
FIG. 3 is a perspective view of the applicator of the present invention illustrating the folding back of the screen protector.
Figure 4:
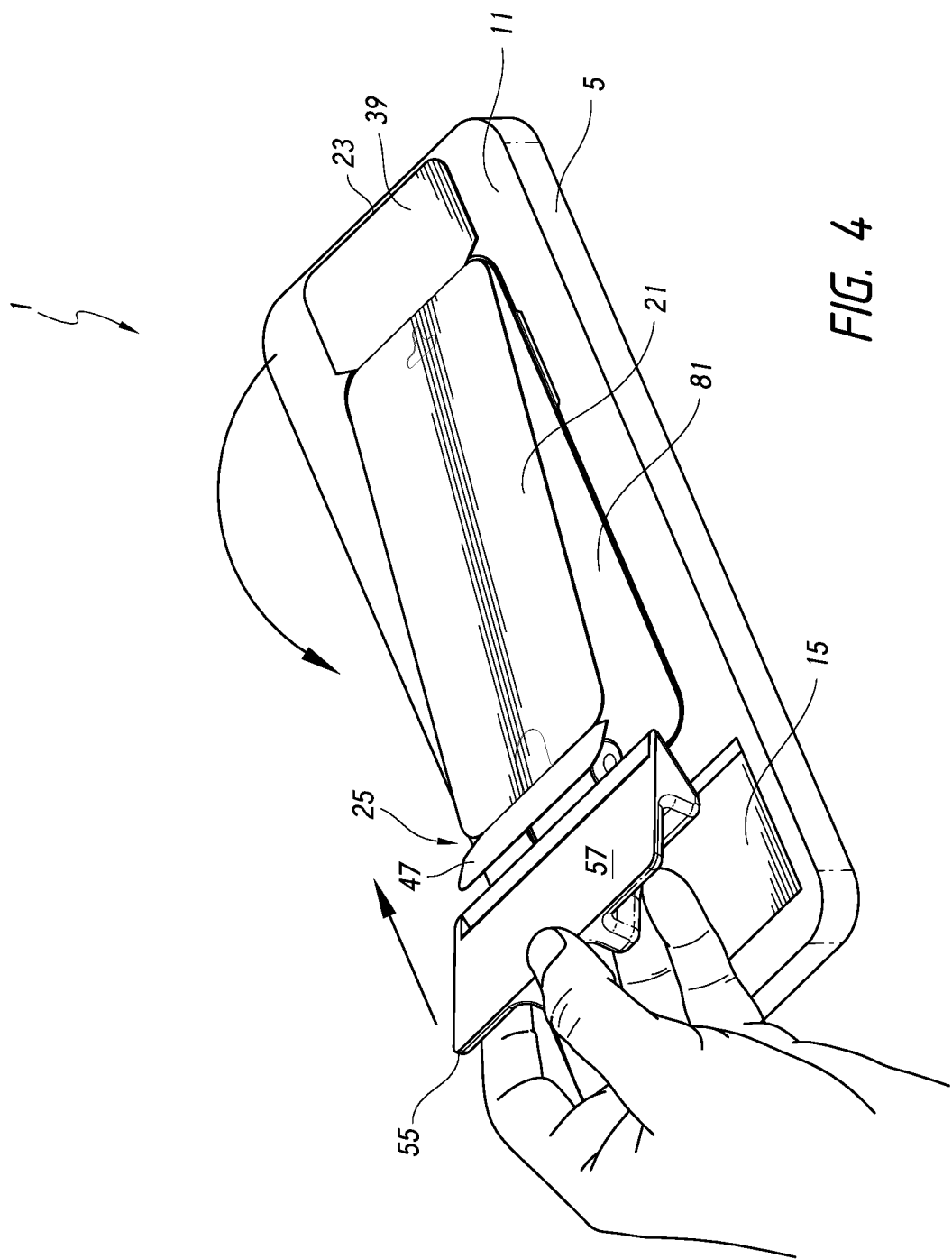
FIG. 4 is a perspective view of the applicator of the present invention illustrating the insertion of the screen protector into the squeegee's slot.
Figure 5:
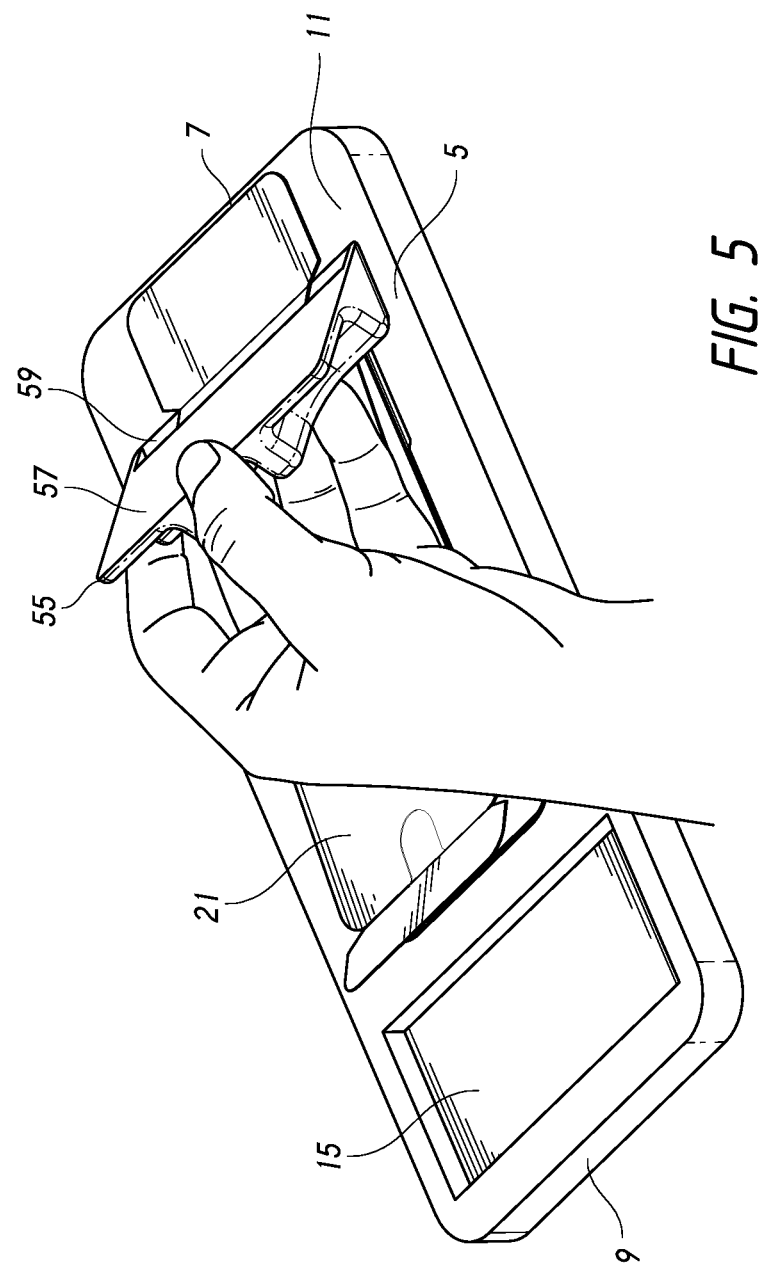
FIG. 5 is a perspective view of the applicator of the present invention illustrating the insertion of the screen protector into the squeegee's slot until the squeegee has engaged the applicator's base.
Figure 6:
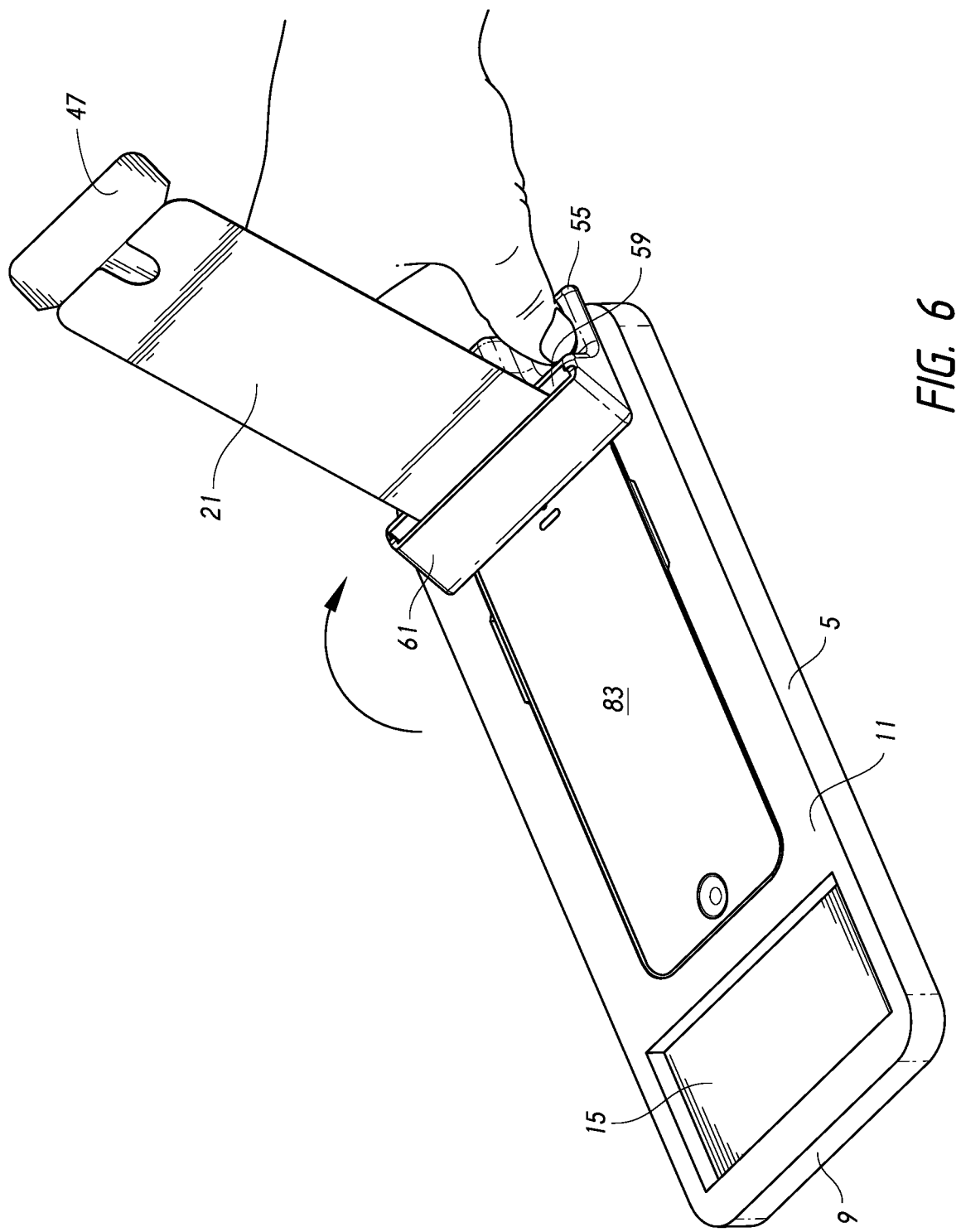
FIG. 6 is a perspective view of the applicator of the present invention illustrating the squeegee and screen protector having been folded back away from the face of an electronic device and upper surface of the base.
Figure 7:
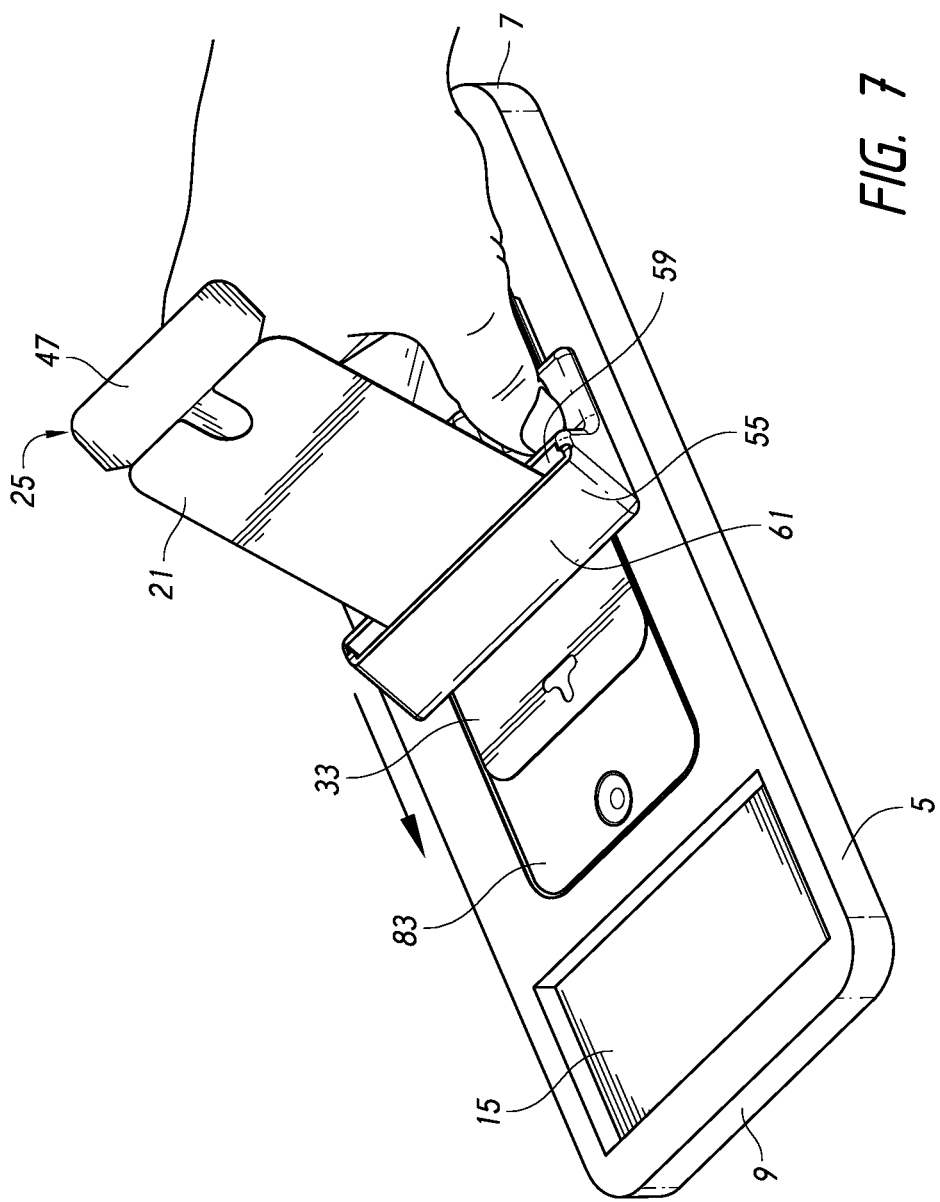
FIG. 7 is a perspective view of the applicator of the present invention illustrating the squeegee being slid across the face of an electronic device and upper surface of the base to remove the screen protector's back liner.
Figure 8:
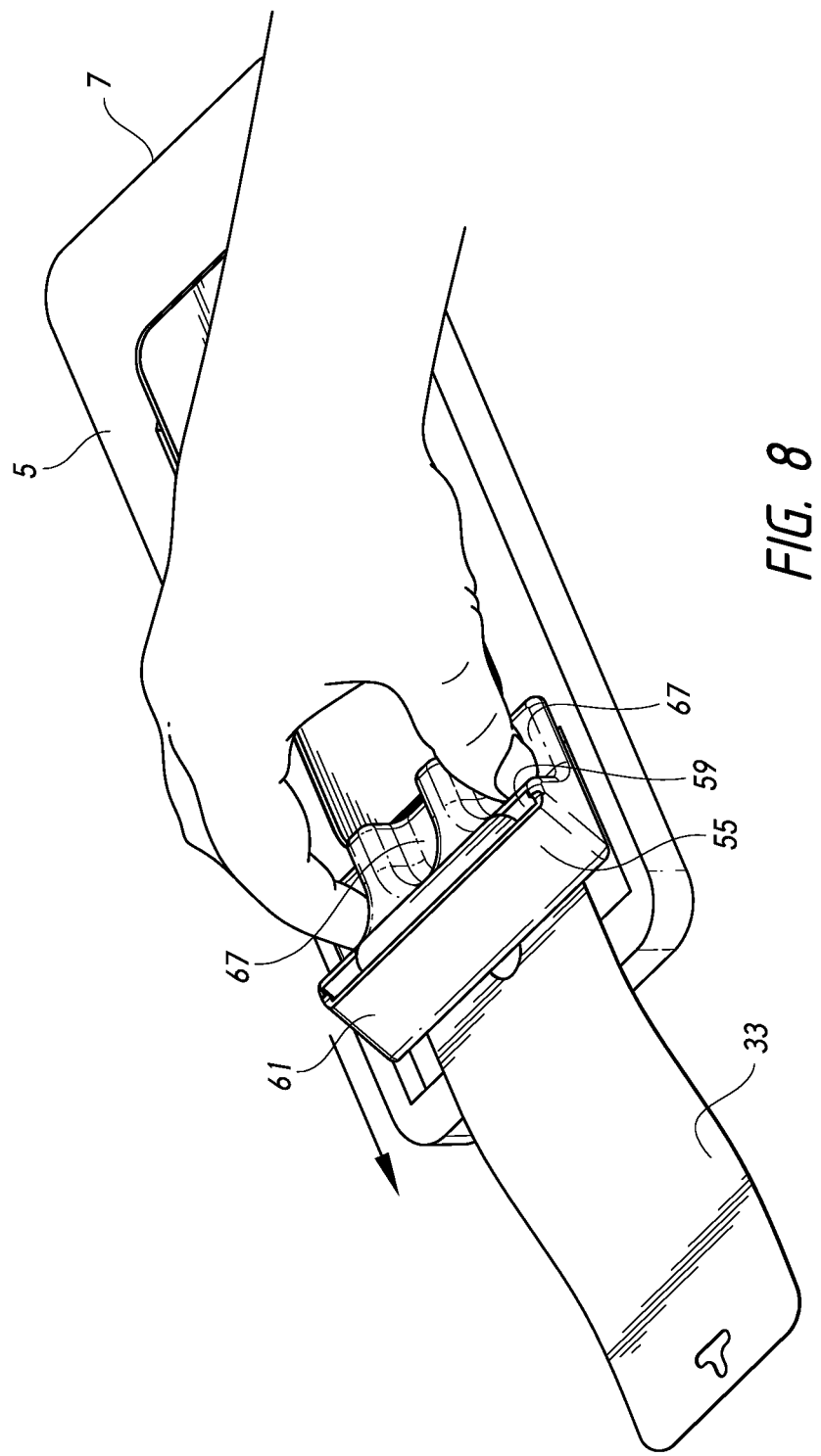
FIG. 8 is an additional perspective view of the applicator of the present invention illustrating the squeegee being slid across the face of an electronic device and upper surface of the base to remove the screen protector's back liner.
Figure 9:
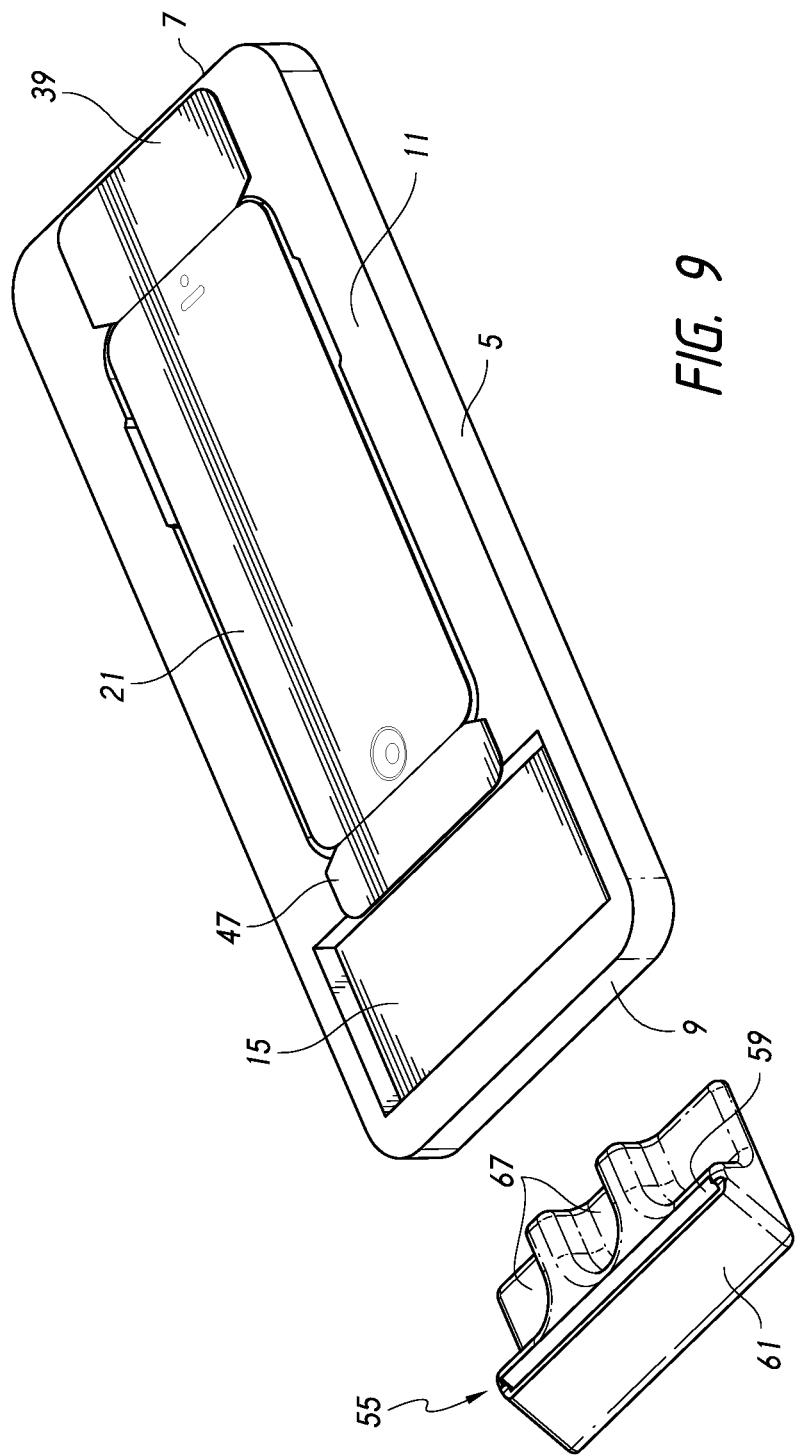
FIG. 9 is a perspective view of the applicator of the present invention illustrating the back liner having been removed from the protective film.

As illustrated in FIG. 2, to apply a protective film 27 to an electronic device display 83, the screen protector 21 is folded backwardly to allow insertion of an electronic device 81 into the base's first pocket 13. The electronic device is positioned within the first pocket 13. Thereafter, as illustrated in FIGS. 4 and 5, the screen protector's second end is inserted and made to pass through the squeegee's slot 59. Importantly, the screen protector must be inserted into the squeegee's slot 59 so as to allow the squeegee's bottom surface 57 to engage the base's upper surface 11. For example, the screen protector 21 can be folded backwardly so as to not cover the electronic device 81 and the squeegee can be slid downwardly with the slot receiving the screen protector until the squeegee's bottom surface engages the base's upper surface 11 (see FIG. 5). Alternatively, as illustrated in FIG. 4, the screen protector may be positioned to overlie the base's first pocket 13, and the squeegee slot is made to receive the screen protector 21 with the squeegee positioned upside down with its bottom surface 57 facing upwardly. As illustrated in FIG. 6, once the squeegee 55 has slid the length of the screen protector 21 so as to engage the base at its first end 7, the screen protector 21 is folded backwardly. As illustrated in FIGS. 14 and 15, when the screen protector 21 has been folded back in accordance with the angle 63 between the squeegee's bottom surface 57 and slot 59, the screen protector's back liner 33 is made to crack and peel from the protective film 27. Thereafter, as illustrated in FIGS. 7 and 8, the squeegee 55 is slid across the base's upper surface 11 and the electronic device's display 83 so as to cause the back liner 33 to peel away from the protective film 27. Advantageously, the squeegee also forces out any bubbles between the protective film 27 and the electronic device's display 83. Once the squeegee has completely slid across the electronic device, the base liner 33 has been forced to peel away completely from the protective film 27 leaving the protective film securely adhered to the electronic device 81.

Figure 10:
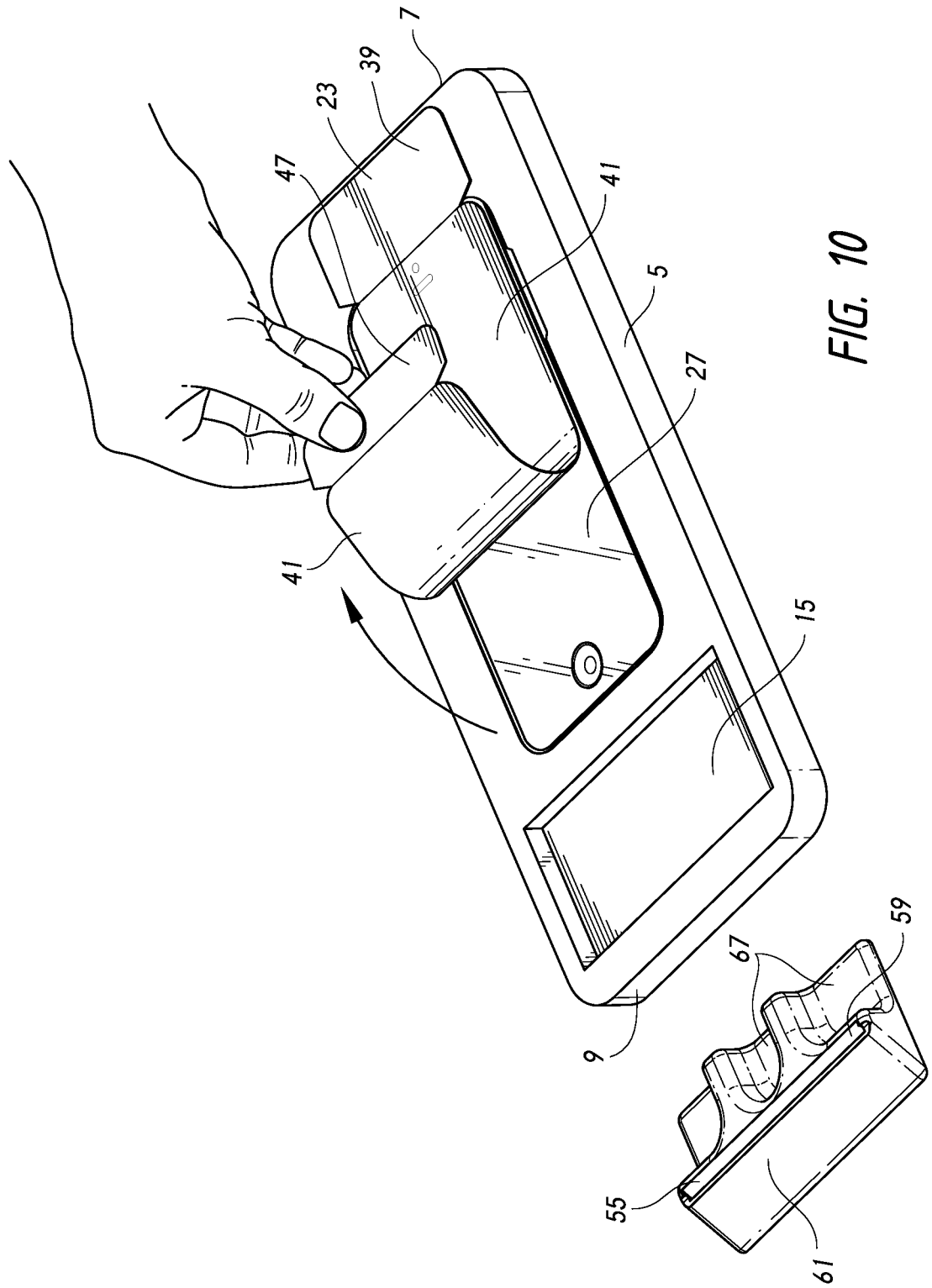
FIG. 10 is a perspective view of the applicator of the present invention illustrating the cap sheet being removed from the protective film.
Figure 11:
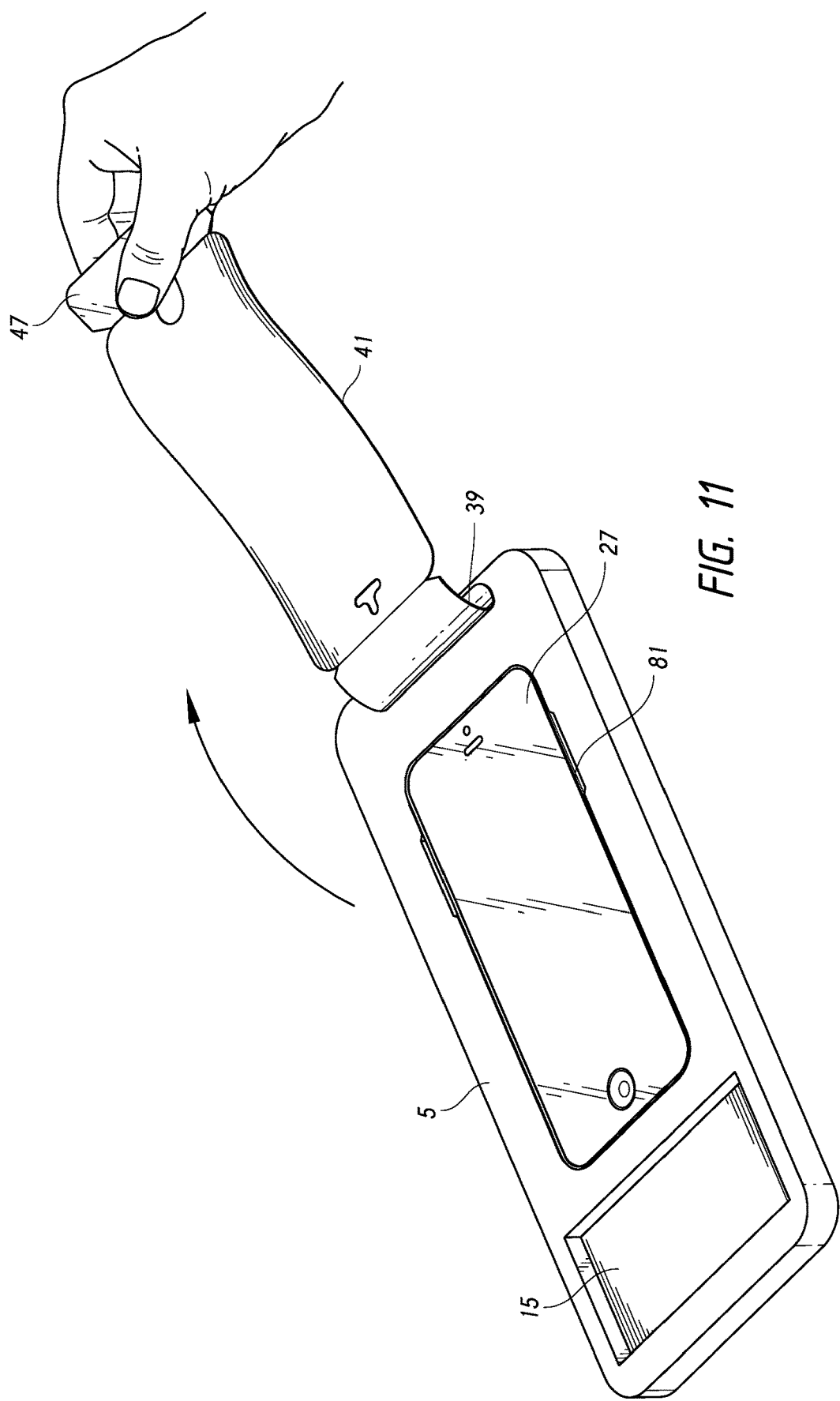
FIG. 11 is a perspective view of the applicator of the present invention illustrating the cap sheet having been removed from the protective film.

With reference to FIGS. 10-12, once the back liner has been removed from the protective film, the cap sheet 41 is removed from the protective film by simply peeling one end of the cap sheet 41 away from the protective film 27 until the cap sheet has been completely removed. To facilitate its removal, preferably the cap sheet 41 includes a tab 47 located at the screen protector's second end 25 which provides one with the ability to firmly grip the cap sheet for its removal. As illustrated in FIG. 16, preferably the cap sheet 41 is adhered to the protective film 27 with an adhesive 49 which provides less adhesion between the cap sheet 41 and protective film 27 at the end where one first grasps the cap sheet 41 to affect its removal from the protective film. The change in adhesion may be accomplished by various means known to those skilled in the art including the use of lesser or more adhesive at different locations or the use of different adhesives between the protective film and cap sheet. (See FIG. 16). Preferably, the adhesion, as measured by pull strength between the protective film 27 and cap sheet 41, is between 10%-90% at one end of the screen protector as compared to the other end. More preferably, the adhesion is 30%-50% at one end of the screen protector as compared to the other. Moreover, it is preferred that the difference in adhesion changes in at least one gradient, and more preferably in a plurality of gradients, and still more preferably gradually and uniformly from one end of the screen protector to the other. This difference in adhesion is advantageous so that adhesion is reduced at the end wherein the cap sheet is first peeled away from the protective shield so as to prevent pulling the protective film 27 away from the electronic device 81.

As one skilled in the art will appreciate, different persons may refer to the same feature or component by different names. For example, any reference to "up" or "down", or reference to a "first end" or "second end" is made for purposes of clarity.

While several particular forms of the invention have been illustrated in described, it will be apparent that various modifications can be made without departing from the spirit and scope of the invention. Therefore, it is not intended that the invention be limited accept by the following claims.

Having described my invention in such terms so as to enable persons skilled in the art to understand the invention, recreate the invention and practice it, and having presently identified the presently preferred embodiments thereof, we claim:

1. An applicator kit for applying a protective film to an electronic device, the applicator kit comprising:
    a squeegee with a slot:
    a base having an upper surface comprising:
        a first pocket conforming to the back side of said electronic device such that a screen of said electronic device is coplanar with said upper surface;
        a screen protector adapted to be received within the slot comprising:
            a plurality of protective layers including the protective film, said plurality of protective layers separably adhered to one another and having an upper tab, a lower tab, and a conformal portion that conforms to the shape of said screen;
            wherein said upper tab is affixed to said base's upper surface, and
            wherein said upper tab is separated from said conformal portion by one or more kiss cuts in said protective layers, wherein said kiss cuts are adapted to cause said upper tab to separate from said conformal portion.

2. The applicator kit of claim 1 wherein:
    said squeegee comprises a flat bottom surface and a first flat angled surface meeting said flat bottom surface at a rounded edge such that the angle between said flat bottom surface and said first flat angled surface is less than 90°, and a second flat angled surface disposed parallel to said first flat angled surface, such that said first and said second flat angled surfaces define said slot.

3. The applicator kit of claim 1 wherein:
    said squeegee has a flat bottom surface and a laterally extending bore forming said slot, which is sized to receive said screen protector and angled relative to said squeegee's flat bottom surface at an angle less than 90° such that when said screen protector is inserted into said slot, and said flat bottom surface is parallel to said base's upper surface, said screen protector is bent at an angle greater than 90° and movement of said squeegee across said base's upper surface causes said upper tab to separate from said conformal portion leaving said protective film adhered to said screen.

4. The applicator kit of claim 3 wherein said squeegee's slot is angled relative to said squeegee's flat bottom surface between 28° and 48°.

5. The applicator kit of claim 1, wherein said plurality of protective layers is comprised of plastic.

6. An applicator kit for applying a protective film to an electronic device, comprising:
    a base comprising an upper surface, and an opening adapted to conform to the shape of said electronic device;
    a screen protector having a first and a second end, comprising a protective layer and said protective film; and
    a squeegee comprising:
        a handle;
        a substantially flat lower surface and a first flat angled surface meeting said flat lower surface at an edge such that said flat lower surface and said flat angled surface meet at an angle, and wherein the flat lower surface is adapted to place said protective film into contact with the electronic device by sliding over said protective film; and
        a slot, one side of which is defined by the first flat angled surface, wherein the slot is adapted to receive said first end of said screen protector, causing said second end to be bent to an angle greater than 90 degrees;
    wherein said protective layer is removably adhered to and adapted to peelably separate from said protective film when said squeegee's flat lower surface is in contact with and slidably moved parallel to said upper surface.

7. The applicator kit of claim 6, wherein said opening is configured to provide a press-fit to an electronic device within said opening.

8. The applicator kit of claim 7, wherein the angle between said flat lower surface and said slot is sufficient to cause said protective layer to peelably separate from said protective film and simultaneously apply pressure to said protective film.

9. The applicator kit of claim 6, wherein said slot has a second side defined by a second flat angled surface, wherein said first flat angled surface and said second flat angled surface comprise two substantially flat parallel planer surfaces disposed at an angle relative to said flat lower surface, and wherein said edge where said flat lower surface and said first flat angled surface meet is a rounded edge.

10. The applicator kit of claim 6, wherein said screen protector comprises two protective layers removably adhered to opposing sides of said protective film.

11. The applicator kit of claim 10, wherein said protective layers feature kiss cuts adapted to cause said protective layers to separate from said protective film when said screen protector is bent.

12. The applicator kit of claim 6, wherein said second end of said screen protector is separated from said first end using one or more kiss cuts adapted to cause said protective layer and protective film to separate when bent at an angle greater than 90 degrees.

13. The applicator kit of claim 6, wherein said squeegee comprises a single molded article.

14. The applicator kit of claim 6, wherein said angle between said flat lower surface and said first flat angled surface is between 28-48 degrees.

15. The applicator kit of claim 6, wherein said angle between said flat lower surface and said first flat angled surface is 38 degrees.

16. The applicator kit of claim 6, further comprising a pocket disposed in said base's upper surface accommodating said squeegee.

* * * * *